(12) United States Patent
Kuroi

(10) Patent No.: US 8,863,810 B2
(45) Date of Patent: Oct. 21, 2014

(54) SCREEN

(75) Inventor: Kiyoshi Kuroi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 648 days.

(21) Appl. No.: 12/780,360

(22) Filed: May 14, 2010

(65) Prior Publication Data

US 2011/0011542 A1 Jan. 20, 2011

(30) Foreign Application Priority Data

Jul. 14, 2009 (JP) ................. 2009-165677

(51) Int. Cl.
*A47H 1/00* (2006.01)
*E06B 9/08* (2006.01)
*G03B 21/58* (2014.01)

(52) U.S. Cl.
CPC ..................... *G03B 21/58* (2013.01)
USPC ........................ 160/120; 160/133

(58) Field of Classification Search
CPC ............... E06B 9/40; E06B 9/54; E06B 9/08; E06B 9/11; E06B 2009/405; G03B 21/56; G03B 21/58

USPC ............ 160/120, 133, 238, 241, 187
See application file for complete search history.

(56) References Cited

U.S. PATENT DOCUMENTS

| 4,286,485 A * | 9/1981 | Dezvane et al. ............. 82/158 |
| 4,651,480 A * | 3/1987 | Kramer ......................... 52/108 |
| 5,355,643 A * | 10/1994 | Bringolf ...................... 52/108 |
| 7,270,619 B2 * | 9/2007 | Bourc'His .................. 474/202 |

FOREIGN PATENT DOCUMENTS

JP A-2009-58881 3/2009

* cited by examiner

*Primary Examiner* — Katherine Mitchell
*Assistant Examiner* — Jeremy Ramsey
(74) *Attorney, Agent, or Firm* — Oliff PLC

(57) ABSTRACT

A screen includes: a screen base body, wherein the screen base body includes a plurality of substrates, each of the substrates has a sheet part and a connecting part provided at least one of the surfaces of the sheet part, the connecting part of one of the substrates is detachably connected with the connecting part of the other substrate, and when the screen is used the screen base body is produced by connecting the connecting parts of the respective substrates such that the substrates can be combined.

9 Claims, 9 Drawing Sheets

SCREEN

BACKGROUND

1. Technical Field

The present invention relates to a screen.

2. Related Art

A reflection-type screen which reflects image light projected by an image projection apparatus such as a projector to display images is known. Examples of this type of screen involve a roll screen whose screen base body is wound in storage, a panel screen whose screen base body is affixed to a panel having high rigidity, and a stretched screen whose screen base body is stretched over a rectangular frame.

In these examples, the panel screen and the stretched screen have high flatness but cannot be made compact in storage. On the other hand, the roll screen has low flatness due to possible wrinkles and waves produced on the periphery and center of the screen base body. In this case, the quality of the images projected on the roll screen easily deteriorates.

For overcoming these problems, such a screen has been proposed which has a plurality of bars extending in the width direction on the side opposite to the projection receiving surface of the screen base body (screen main body) to increase the flatness of the screen base body (for example, see JP-A-2009-58881).

According to the screen disclosed in JP-A-2009-58881, however, winding creases are easily produced on the screen base body when the screen base body is wound for storage by using a winding shaft in a direction substantially perpendicular to the extension direction of the bars and along the projection receiving surface. In this case, the extended screen base body tends to be curled. Moreover, when the screen has a rail member for guiding the screen base body as in the technology shown in this reference, the rail member as well as the screen base body needs to be drawn out for use. Thus, handling of the screen becomes complicated.

SUMMARY

It is an advantage of some aspects of the invention to provide a screen having high flatness.

A screen according to an aspect of the invention includes a screen base body. The screen base body contains a plurality of substrates. Each of the substrates has a sheet part and a connecting part provided at least one of the surfaces of the sheet part. The connecting part of one of the substrates is detachably connected with the connecting part of the other substrate. The screen base body is produced by connecting the connecting parts of the respective substrates such that the substrates can be combined when the screen is used.

According to this structure, the screen base body is formed by combining the plural substrates via the connecting parts during use of the screen. Thus, the screen base body has high rigidity, and the flatness of the screen base body improves. Moreover, the screen which has the screen base body formed by combining the substrates via the connecting parts during use of the screen can be stored with the respective substrates separated while the screen is not used.

It is preferable that the plural substrates are combined with each other by the connecting parts such that the substrates are opposed to each other in the directions of stresses acting on the substrates.

Each of the connecting parts is located at the center or the end of the substrate, for example.

According to this structure, a stress acting on one of the substrates can be cancelled by a stress acting on the other substrate. More specifically, generation of the curls on the screen base body is prevented by combining the substrates such that the substrates come opposed to each other in the direction of the curls produced on the substrates. Thus, the flatness of the screen base body can securely increase.

It is preferable that each of the connecting parts has a plurality of engaging portions disposed on the one surface at predetermined intervals in a first direction extending along the one surface. In this case, the substrates are combined with each other when the plural engaging portions on one of the substrates engage between the plural engaging portions on the other substrate.

The shapes of the engaging portions may be any shapes as long as the substrates can be combined by the engaging portions. For example, each of the engaging portions has a projection and a concave at both ends in the first direction, and the substrates are combined by inserting the projections of the engaging portions on one of the substrates into the concaves of the engaging portions on the other substrate.

According to this structure, the respective substrates can be firmly connected with each other by engagement of the engaging portions on one of the substrates between the engaging portions on the other substrate. Thus, the flatness of the screen base body produced by the substrates can further increase.

When the respective engaging portions are provided at both ends in a second direction extending along the one surface having the connecting part and perpendicular to the first direction, the respective substrates can be further firmly connected. Thus, the flatness of the screen base body can further increase.

It is preferable that each of the engaging portions has an expanding portion as a larger end on the side away from the one surface where the engaging portion is provided than the end of the engaging portion on the side close to the one surface. In this case, the engaging portions on one of the substrates and the engaging portions on the other substrate engage with each other by the expanding portions.

According to this structure, the expanding portions of the adjoining two engaging portions on one of the substrates engage with the expanding portion of one engaging portion on the other substrate when the engaging portions on the other substrate is fitted between the engaging portions on the one substrate. In this case, separation of the one substrate from the other substrate is prevented. Thus, the respective substrates can be firmly combined, and the flatness of the screen base body formed by the substrates can be further enhanced.

It is preferable that each of the engaging portions provided at least on one of the plural substrates has an elastic portion in an area contacting the engaging portion provided on the other substrate.

According to this structure, the movements of the engaging portions are regulated by the elastic force and frictional force of the elastic portions of the engaging portions. In this case, the engaging portions provided on one of the substrates and engaging with the engaging portions provided on the other substrate do not drop from the positions between the engaging portions on the other substrate. Thus, separation of the one substrate from the other substrate is further securely prevented. Accordingly, the engagement condition of the respective engaging portions is more firmly maintained, and the flatness of the screen base body can be further enhanced.

It is preferable that each of the connecting parts has a support portion which extends along the one surface and supports the sheet part in a second direction perpendicular to the first direction.

According to this structure, generation of wrinkles or the like on the sheet parts can be prevented by the support portions for supporting the sheet parts in the second direction.

When the support portions are connected with the sheet parts for the entire areas of the support portions facing the sheet parts, generation of wrinkles or the like can be more securely prevented. According to the structure including the support portions, warps which deform the sheet parts such that the surfaces having the support portions lie outside and that the surfaces not having the support portions lie inside may be produced. In other words, prominent warps are caused at the both ends in the second direction compared to at the center of the sheet portion. These warps become remarkable when the support portions are made of synthetic resin or the like and have relatively low rigidity. It is considered that the support portions are made of metal to increase the rigidity. In this case, however, the weight of the connecting parts increases and thus the entire screen becomes heavy when the screen base body has about 100 inches.

When the respective substrates are connected with each other such that the surfaces having the connecting parts are opposed to each other, stresses causing the warps of the sheet parts can be cancelled even in case of the support portions having relatively low rigidity. Thus, the flatness of the screen base body can further improve. In addition, the weight of the screen base body can be reduced compared with the screen base body having the metal support portions.

When the engaging portions have bar shapes extending in the second direction, the engaging portions function as the support portions as well.

It is preferable that the respective substrates are combined with each other by surface connection by the connecting parts of the substrates.

According to this structure, the respective substrates are combined by surface connection via the connecting parts of the substrates. Thus, the flatness of the screen base body can be increased, and separation of the substrates can be more securely prevented.

It is preferable that the screen further includes: a housing which accommodates the plural substrates; a combining unit provided within the housing to combine the plural substrates when the plural substrates are drawn from the housing; and a plurality of winding shafts around each of which the corresponding one of the plural substrates is wound within the housing.

For example, the combining unit has a pair of components disposed at positions between which the respective substrates are sandwiched to guide the substrates for drawing out, such as guide rails, and rollers rotating in opposite directions.

According to this structure, the respective substrates are properly combined by the combining unit when the substrates are drawn from the housing and formed into the screen base body. Thus, the screen base body can be appropriately and easily formed by combining the substrates accommodated in the housing.

Moreover, each of the substrates can be wound around the corresponding winding shaft. Thus, space saving of the housing can be achieved, and the screen as well as the housing can be made compact.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment

Figure 1:
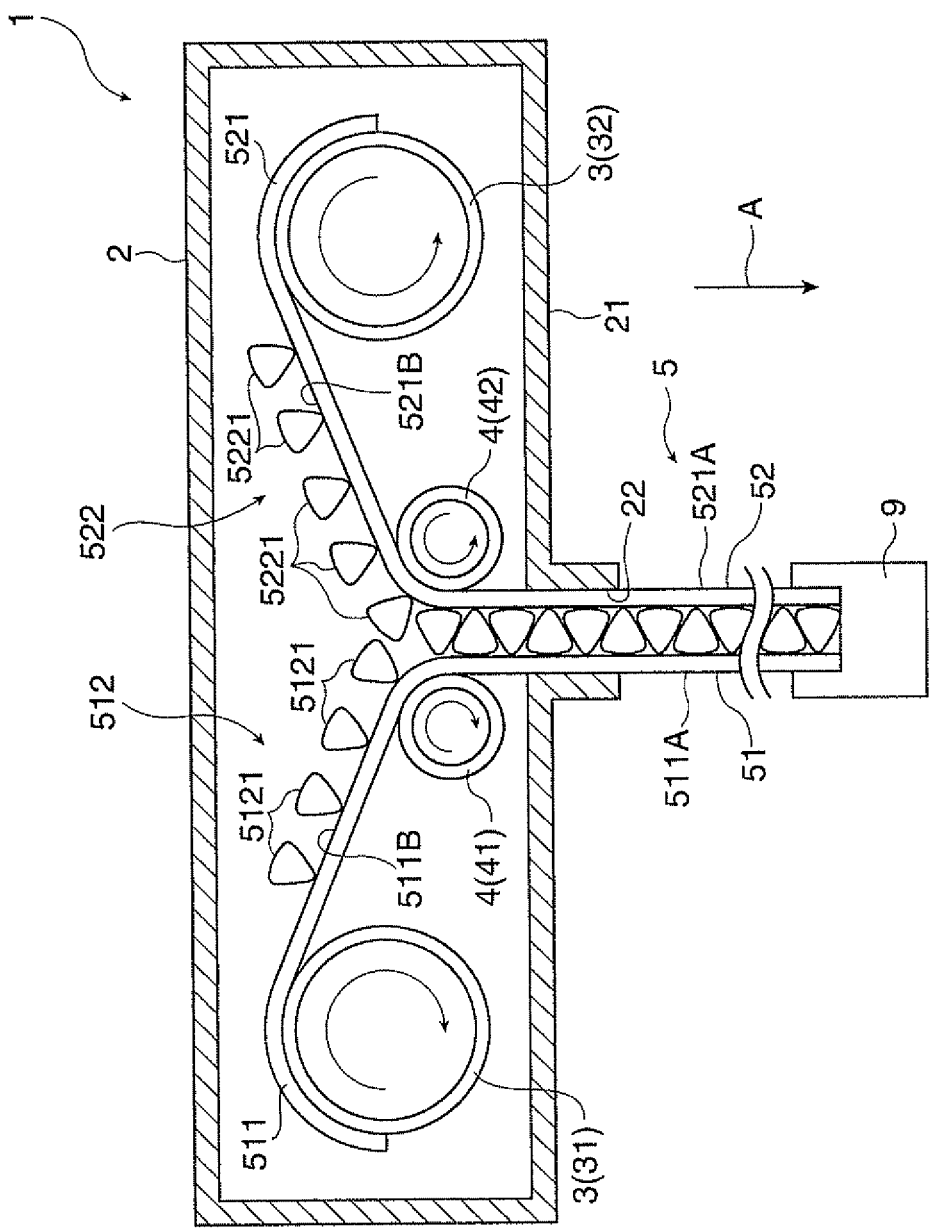
FIG. 1 is a vertical cross-sectional view of a screen according a first embodiment of the invention.

A first embodiment according to the invention is hereinafter described with reference to the drawings.
General Structure of Screen FIG. 1 is a side view showing a screen 1 according to this embodiment.

The screen 1 in this embodiment reflects an image projected from an image projection apparatus such as a projector for display. As illustrated in FIG. 1, the screen 1 includes a housing 2, a winding device 3 accommodated in the housing 2, a combining unit 4, and a screen base body 5. According to the screen 1, the screen base body 5 having a projection receiving surface is produced by combining a plurality of substrates (substrates 51 and 52 described later) drawn from a plurality of winding shafts (winding shafts 31 and 32 described later) disposed within the housing 2 by the function of the combining unit 4 during use. The details of this method will be explained later.

In this embodiment, the housing 2 is a box-shaped case fixed to the ceiling or the like. A lower surface 21 of the housing 2 has an opening 22 through which the screen base body 5 accommodated in the housing 2 is drawn out. The size of the opening 22 is determined in accordance with the width of the screen base body 5.

The winding device 3 takes up the screen base body 5 within the housing 2. The winding device 3 has the winding shafts 31 and 32 connecting with one ends of the substrates 51 and 52 of the screen base body 5, respectively, and the substrates 51 and 52 are wound around the winding shafts 31 and 32 in roll shapes. In this embodiment, the winding shafts 31 and 32 are disposed such that the respective axial directions extend in parallel with each other with a predetermined space left between the winding shafts 31 and 32. The winding shafts 31 and 32 may be constituted by spring rolls, or rollers rotated by an actuator such as a motor.

The combining unit 4 combines the substrates 51 and 52 by guiding the substrates 51 and 52 extended from the winding shafts 31 and 32 in such directions that the substrates 51 and 52 come into contact with each other when the screen base body 5 is drawn from the housing 2. In this embodiment, the combining unit 4 has a pair of rollers 41 and 42 rotated in opposite directions. The respective rollers 41 and 42 are disposed between the winding shafts 31 and 32 in such positions that the axial directions of the rollers 41 and 42 extend substantially in parallel with those of the winding shafts 31 and 32. When the screen base body 5 is drawn out, each of the rollers 41 and 42 rotates in the same direction as the rotation direction of the winding shaft 31 or 32 disposed closer.

The combining unit 4 may be constituted by guide members for guiding the respective substrates 51 and 52 in place of the rollers 41 and 42.

Structure of Screen Base Body

The screen base body 5 is drawn from the housing 2 to form a projection receiving surface on which an image is projected from the image projection apparatus. As explained above, the screen base body 5 is produced by combining the substrates 51 and 52 one ends of which connect with the winding shafts 31 and 32, respectively. The lower ends of the substrates 51 and 52 are kept connected with each other, and a weight 9 for maintaining the drawn condition of the screen base body 5 is provided at the lower ends.

The substrate 51 has a sheet part 511 formed by a substantially rectangular sheet material, and a connecting part 512 provided on one surface of the sheet part 511. The substrate 52 has a sheet part 521 having approximately the same size and made of the same material as those of the sheet part 511, and a connecting part 522 provided on one surface of the sheet part 521.

At least one of surfaces 511A and 521A of the sheet parts 511 and 521 (the surfaces 511A and 521A facing the inside when wound around the winding shafts 31 and 32) becomes the projection receiving surface on which an image is projected.

The connecting parts 512 and 522 are provided on sheet-shaped surfaces 511B and 521B opposed to each other when the substrates 51 and 52 are combined (the surfaces 511B and 521B on the side opposite to the surfaces 511A and 521A). The connecting parts 512 and 522 are detachably connected with each other.

The connecting parts 512 and 522 have a plurality of engaging portions 5121 and 5221, respectively, provided at equal intervals in a drawing direction A for drawing the screen base body 5 from the housing 2 (a first direction of the invention). The connecting parts 512 and 522 having the engaging portions 5121 and 5221 expand substantially for the entire areas of the surfaces 511B and 521B. The intervals of the engaging portions 5121 are determined in accordance with the sizes of the engaging portions 5221 in the drawing direction A. Also, the intervals of the engaging portions 5221 are determined in accordance with the sizes of the engaging portions 5121 in the drawing direction A.

Structure of Engaging Portions

Figure 2:
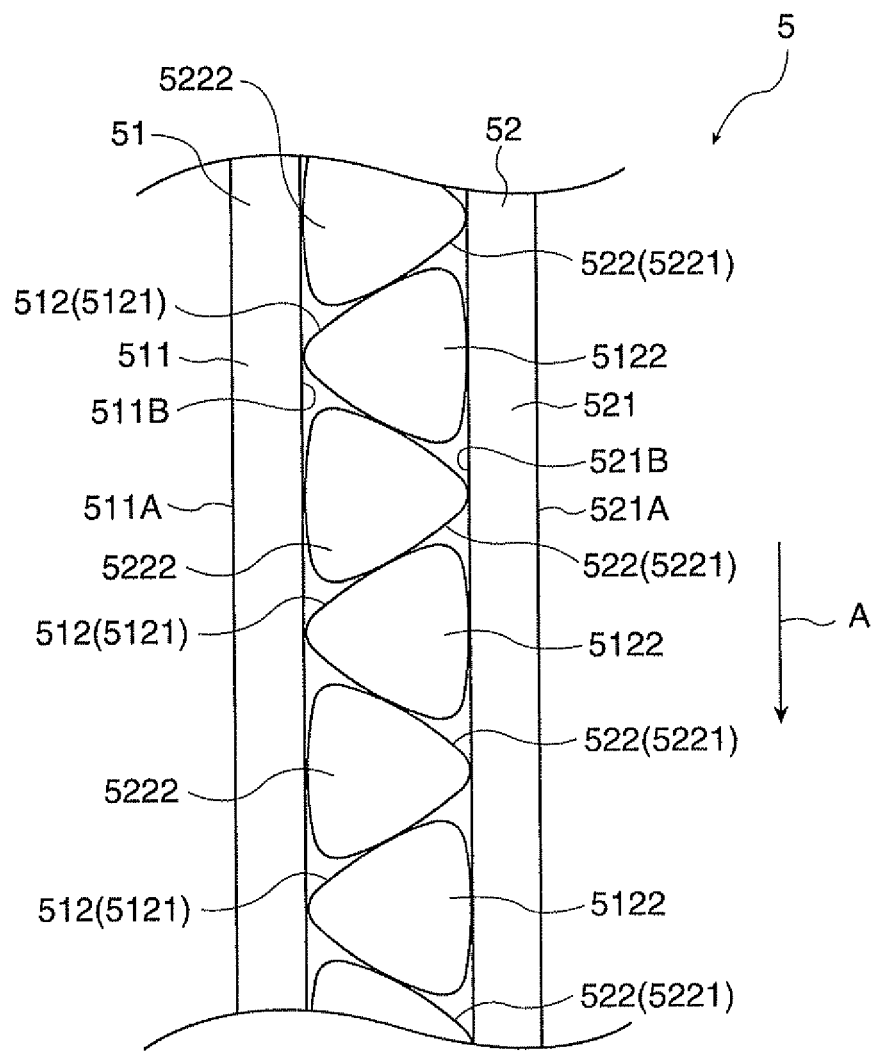
FIG. 2 is a side view illustrating an expanded part of a screen base body according to the first embodiment.

FIG. 2 is a side view illustrating an expanded part of the screen base body 5.

As illustrated in FIGS. 1 and 2, each of the engaging portions 5121 and 5221 is a bar-shaped member made of synthetic resin and having a substantially isosceles-triangular shape in the cross-sectional view (more specifically, a substantially equilateral-triangular shape whose vertexes are beveled in the cross-sectional view).

The engaging portions 5121 are disposed on the surface 511B in such a manner as to extend in the width direction of the surface 511B (a direction along the surface 511B and substantially perpendicular to the drawing direction A as a second direction of the invention) and to support the surface 511B in the width direction of the surface 511B. Similarly, the engaging portions 5221 are disposed on the surface 521B in such a manner as to extend in the width direction of the surface 521B and support the surface 521B in the width direction of the surface 521B.

More specifically, the engaging portions 5121 and 5221 connect with the entire areas of the surfaces 511B and 521B by the surfaces on the 511B and 521B sides. Thus, the engaging portions 5121 and 5221 also function as support portions of the invention.

Moreover, as explained above, the engaging portions 5121 and 5221 are provided in such conditions as to engage with each other substantially for the entire area of the screen base body 5 when the substrates 51 and 52 are combined. Thus, the substrates 51 and 52 are joined with each other by surface connection for the entire areas both in the drawing direction A and in the width direction.

The portions corresponding to the vertical angles of the engaging portions 5121 and 5221 are attached to the surfaces 511B and 521B such that the sides opposed to the vertical angles are substantially in parallel with the surfaces 511B and 521B. In other words, each of the engaging portions 5121 has an expanding portion 5122 at the end opposite to the surface 511B side as a portion expanding along the surface 511B and having a length larger than that of the surface 511B side end. On the other hand, each of the engaging portions 5221 has an expanding portion 5222 at the end opposite to the surface 521B side as a portion expanding along the surface 521B and having a length larger than that of the surface 521B side end.

Combination of Substrates

The substrates 51 and 52 are combined by engagement between the engaging portions 5121 and 5221 achieved by the combining unit 4 when the substrates 51 and 52 are drawn from the winding shafts 31 and 32.

More specifically, the respective substrates 51 and 52 drawn from the winding shafts 31 and 32 are guided by the rollers 41 and 42 in such directions that the surfaces 511B and 521B come close to each other. In this condition, the engaging portions 5121 and 5221 are inserted between the other engaging portions as the substrates 51 and 52 are drawn out. As a result, the substrates 51 and 52 are combined by engagement between the engaging portions 5121 and 5221.

More specifically, each of the expanding portions 5122 engages between the surface 521B side ends of an adjoining pair of the engaging portions 5221, and similarly each of the expanding portions 5222 engages between the surface 511B side ends of an adjoining pair of the engaging portions 5121. As a result, the engaging portions 5121 and 5221 as well as the expanding portions 5122 and 5222 engage with each other, allowing regulation over separation of the substrates 51 and 52. This condition maintains connection between the substrates 51 and 52, and allows formation of the screen base body 5.

When wound around the winding shafts 31 and 32, the respective substrates 51 and 52 are guided by the rollers 41 and 42 in directions opposite to each other and inclined to the drawing direction A. As a result, the engagement between the engaging portions 5121 and 5221 is released, and the connecting parts 512 and 522 are separated from each other. By this method, the substrates 51 and 52 are separately wound around the winding shafts 31 and 32.

Stresses on Substrates

Stresses acting on the respective substrates 51 and 52 are now explained.

Figure 3:
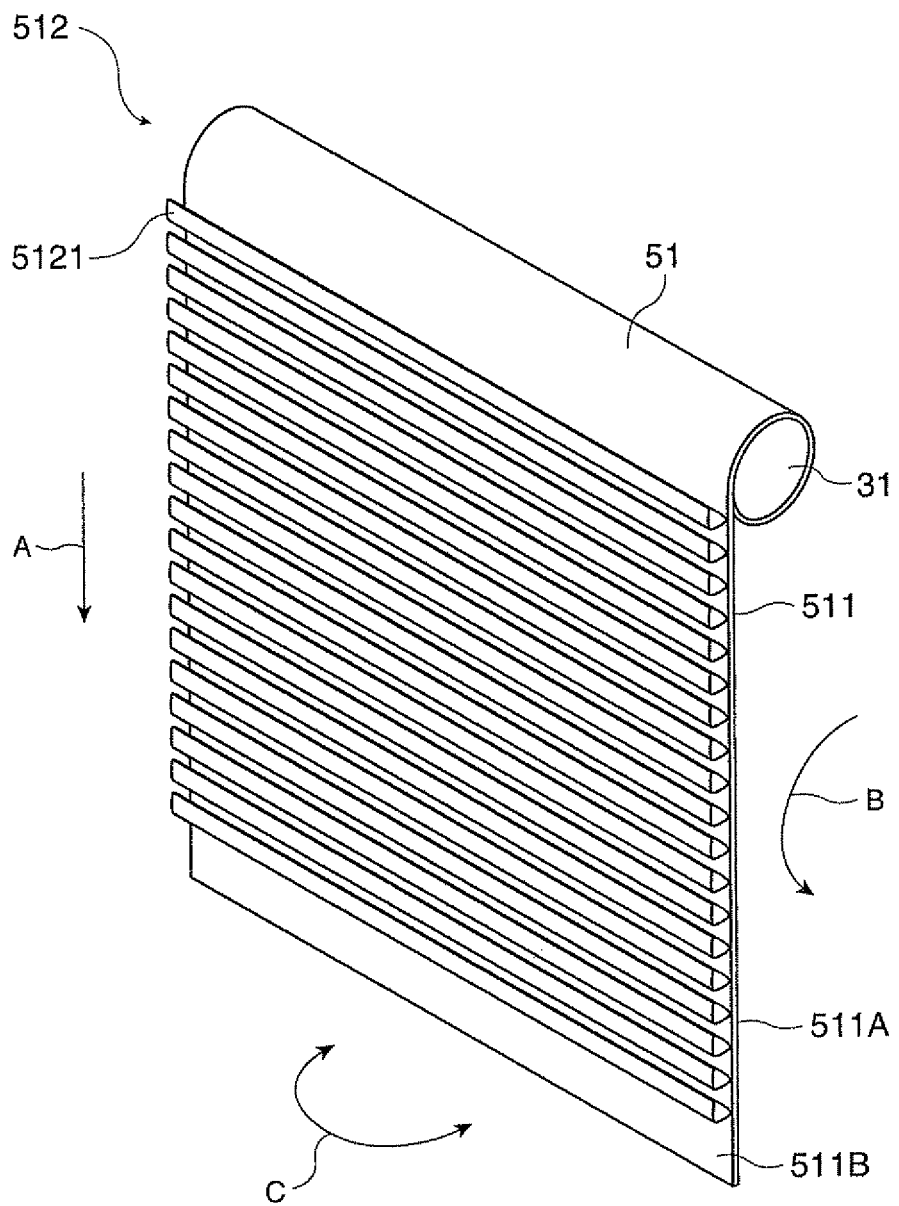
FIG. 3 illustrates the directions of stresses acting on one of substrates according to the first embodiment.

FIG. 3 illustrates the directions of stresses acting on the substrate 51.

As illustrated in FIG. 3, the substrate 51 wound around the winding shaft 31 in a roll shape has winding creases. Thus, a bending stress generated by winding the leading end of the substrate 51 in the drawing direction A toward the surface 511A (stress in a direction indicated by an arrow B) acts on the substrate 51, and curls (bends) the substrate 51. Moreover, the engaging portions 5121 made of synthetic resin have relatively lower rigidity than that of metal material. Thus, a stress which more largely bends both ends in the width direction of the substrate 51 toward the side opposite to the engaging portions 5121 side than the center of the substrate 51 (stress in a direction indicated by an arrow C) acts on the substrate 51, and warps (bends) the substrate 51.

The substrate 52 also deforms similarly to the substrate 51. When either of the substrates 51 and 52 is separately used as the screen base body, the quality of the projected image deteriorates (the image is distorted) due to deformation of the substrate 51 or 52.

When the substrates 51 and 52 are connected such that the surface 511B having the engaging portions 5121 and the surface 521B having the engaging portions 5221 are opposed to each other, the stresses causing the curls and warps can be cancelled between the substrates 51 and 52. Thus, the flatness of the screen base body 5 increases, and the quality of the projected image does not lower.

The screen 1 according to this embodiment described herein can provide the following advantages.

During use of the screen 1, the respective substrates 51 and 52 are combined by the connecting parts 512 and 522 to form the screen base body 5. Thus, the screen base body 5 has higher rigidity than that of the screen base body constituted by only either the substrate 51 or the substrate 52. Accordingly, the flatness of the screen base body 5 improves.

The substrates 51 and 52 are connected by the connecting parts 512 and 522 such that the surfaces 511B and 521B located outside when wound around the winding shafts 31 and 32 and having the connecting parts 512 and 522 are disposed opposed to each other. In this case, the stresses generated on the substrates 51 and 52 wound around the winding shafts 31 and 32 and causing curls (bending stresses) can be cancelled between the substrates 51 and 52. Thus, the flatness of the screen base body 5 can securely increase.

The substrates 51 and 52 are combined by engagement between the plural engaging portions 5121 and 5221 provided on the connecting parts 512 and 522. Thus, the substrates 51 and 52 can be firmly connected.

Moreover, generation of wrinkles or the like on the sheet parts 511 and 521 can be prevented by the engaging portions 5121 and 5221 extending in the width directions of the sheet parts 511 and 521 and supporting the sheet parts 511 and 521. Furthermore, the substrates 51 and 52 are connected such that the surfaces 511B and 521B having the engaging portions 5121 and 5221 are opposed to each other even when the engaging portions 5121 and 5221 have relatively low rigidity. Thus, the stresses causing the warps can be cancelled between the substrates 51 and 52, and the flatness of the screen base body 5 can further increase.

Each of the engaging portions 5121 has the expanding portion 5122 expanding along the surface 511B at the end away from the surface 511B, and each of the engaging portions 5221 has the expanding portion 5222 expanding along the surface 521B at the end away from the surface 521B. According to this structure, the expanding portions 5122 and 5222 engage with each other when the engaging portions on one of the substrates 51 and 52 are inserted between the engaging portions on the other substrate. In this case, the substrates 51 and 52 are not separated from each other. Thus, the substrates 51 and 52 can be firmly connected, and the flatness of the screen base body 5 can be further enhanced.

The substrates 51 and 52 are combined by the connecting parts 512 and 522 having the engaging portions 5121 and 5221 provided throughout the surfaces 511B and 521B. Thus, the substrates 51 and 52 can be combined by surface connection, and the flatness of the screen base body 5 can be further increased. In addition, separation of the substrates 51 and 52 can be further securely prevented.

When drawn from the housing 2, the substrates 51 and 52 are guided in such directions that the surfaces 511B and 521B are opposed to each other by the combining unit 4. Then, the connecting parts 512 and 522 provided on the surfaces 511B and 521B are connected with each other. In this case, connection between the substrates 51 and 52 can be achieved in an appropriate condition. Thus, the screen base body 5 can be properly formed.

The substrates 51 and 52 in the housing 2 are wound around the winding shafts 31 and 32. Thus, the size of the housing 2 can be reduced, and thus the screen 1 can be made compact.

Modifications of First Embodiment

Figure 4:
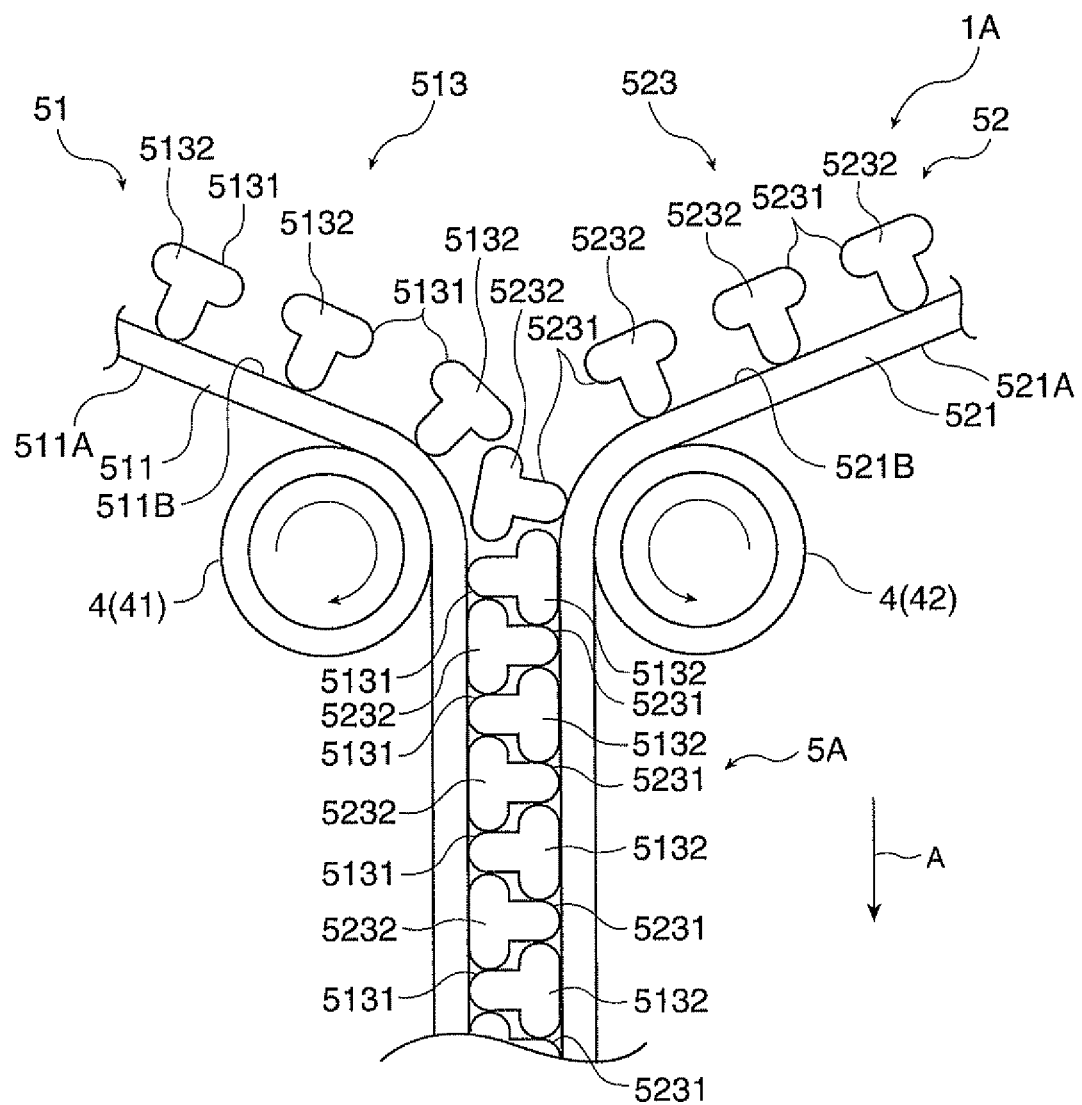
FIG. 4 is a side view of a modified screen according to the first embodiment.

FIG. 4 is a side view illustrating a screen 1A as a modified example of the screen 1.

The screen 1A which includes engaging portions having different shapes can offer advantages similar to those of the screen 1.

More specifically, the screen 1A has functions similar to those of the screen 1, and has structure similar to that of the screen 1 except for a screen base body 5A provided instead of the screen base body 5. As illustrated in FIG. 4, the screen base body 5A has structure similar to that of the screen base body 5 except for connecting parts 513 and 523 disposed on the surfaces 511B and 521B and having plural engaging portions 5131 and 5231 in place of the connecting parts 512 and 522.

The engaging portions 5131 and 5231 are bar-shaped members made of the same synthetic resin. Similarly to the engaging portions 5121 and 5221, the engaging portions 5131 and 5231 extend in the width directions of the surfaces 511B and 521B to support the surfaces 511B and 521B, and are provided at equal intervals in the drawing direction A.

Each of the engaging portions 5131 has a small end on the surface 511B side and a large end on the side opposite to the small end side. More specifically, each of the engaging portions 5131 has an expanding portion 5132 expanding in opposite directions along the surface 511B at the end opposite to the surface 511B side. The expanding direction of the expanding portion 5132 corresponds to the drawing direction A and the opposite direction of the drawing direction A when the substrate 51 is drawn out. The engaging portion 5131 having the expanding portion 5132 has a substantially T shape having beveled corners in the cross-sectional view.

Each of the engaging portions 5231 has a substantially the same shape as each shape of the engaging portions 5131, and has an expanding portion 5232 at the end opposite to the surface 521B side.

The substrates 51 and 52 drawn from the winding shafts 31 and 32 are guided in such directions so as to come close to each other by the combining unit 4, and thus the surfaces 511B and 521B come opposed to each other. Then, the substrates 51 and 52 are combined by insertion of either the engaging portions 5131 or 5231 between the other engaging portions in accordance with further drawing of the substrates 51 and 52. In this case, each of the expanding portions 5232 engages between the ends of the two adjoining engaging portions 5131 on the surface 511B side, and each of the expanding portions 5132 engages between the ends of the two adjoining engaging portions 5231 on the surface 521B side. As a result, the expanding portions 5132 and 5232 engage with each other, preventing separation of the substrates 51 and 52 from each other.

The screen 1A having this structure can offer advantages similar to those of the screen 1.

Figure 5:
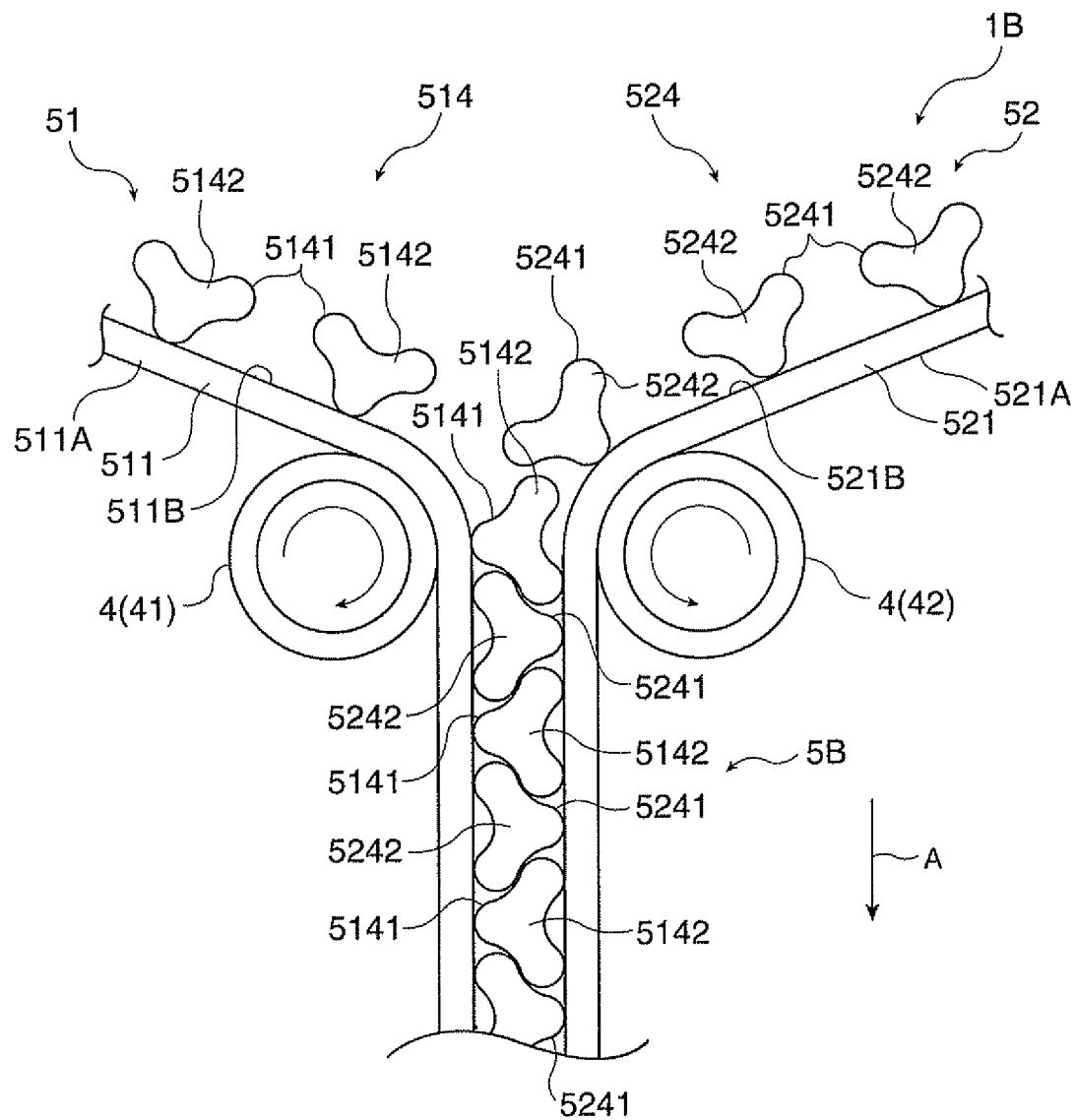
FIG. 5 is a side view of another modified screen according to the first embodiment.

FIG. 5 is a side view showing a screen 1B as another modification of the screen 1.

The screen 1B which includes engaging portions having shapes different from those of the screen 1 and 1A can offer advantages similar to those of the screen 1.

More specifically, the screen 1B has functions similar to those of the screen 1, and has structure similar to that of the screen 1 except for a screen base body 5B provided instead of the screen base body 5. As illustrated in FIG. 5, the screen base body 5B has structure similar to that of the screen base body 5 except for connecting parts 514 and 524 disposed on the surfaces 511B and 521B and having plural engaging portions 5141 and 5241 in place of the connecting parts 512 and 522.

The engaging portions 5141 and 5241 are bar-shaped members made of the same synthetic resin. Similarly to the engaging portions 5121 and 5221, the engaging portions 5141 and 5241 extend in the width directions of the surfaces 511B and 521B to support the surfaces 511B and 521B, and are provided at equal intervals in the drawing direction A.

Each of the engaging portions 5141 has a small end on the surface 511B side and a large end on the side opposite to the small end side. More specifically, each of the engaging portions 5141 has an expanding portion 5142 expanding in opposite directions with inclination along the surface 511B at the end opposite to the surface 511B side. The expanding direction of the expanding portion 5142 corresponds to the drawing direction A and the opposite direction of the drawing direction A when the substrate 51 is drawn out.

Each of the engaging portions 5241 has a substantially the same shape as each shape of the engaging portions 5141, and has an expanding portion 5242 at the end opposite to the surface 521B side of the engaging portions 5241.

Similarly to the screens 1 and 1A, the substrates 51 and 52 are combined by insertion of either the engaging portions 5141 or 5241 between the other engaging portions. In this case, each of the expanding portions 5242 engages between the ends of the two adjoining engaging portions 5141 on the surface 511B side, and each of the expanding portions 5142 engages between the ends of the two adjoining engaging portions 5241 on the surface 521B side. As a result, the expanding portions 5142 and 5242 engage with each other, preventing separation of the substrates 51 and 52 from each other.

The screen 1B having this structure can offer advantages similar to those of the screen 1.

As apparent from these modifications, the shapes of the engaging portions provided on the respective substrates are not limited to those specified in the first embodiment but may be any shapes as long as the engaging portions on one of the substrates can engage with the engaging portions on the other substrate.

2. Second Embodiment

A screen according to a second embodiment is now described.

The screen in this embodiment has structure similar to that of the screen 1. According to the screen 1, the substrates 51 and 52 are combined by engagement between the connecting parts 512 and 522. According to the screen in this embodiment, however, the substrates are combined by inserting engaging portions of the connecting part on one of the substrates between engaging portions of the other connecting part on the other substrate such that the engaging portions on the one substrate can be held between the engaging portions on the other substrate. The screen in this embodiment is different from the screen 1 in this point. In the following explanation, the same reference numbers are given to parts same or substantially same as those described above, and the same explanation is not repeated.

Figure 6:
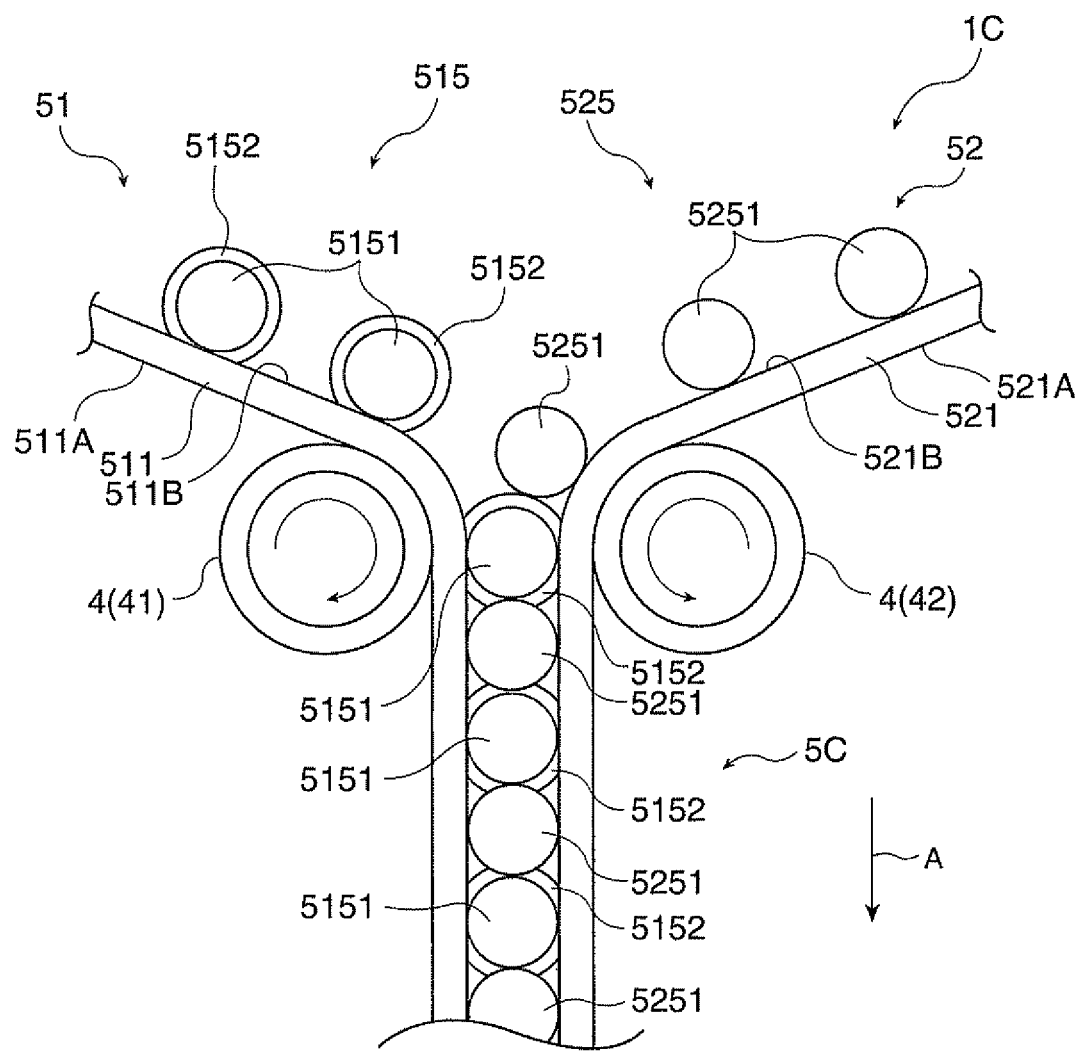
FIG. 6 is a side view of a screen according to a second embodiment of the invention.

FIG. 6 is a side view illustrating a screen 1C in this embodiment.

The screen 1C has functions similar to those of the screen 1, and has structure similar to that of the screen 1 except for a screen base body 5C provided instead of the screen base body 5. As illustrated in FIG. 6, the screen base body 5C has structure similar to that of the screen base body 5 except for connecting parts 515 and 525 disposed on the surfaces 511B and 521B and having plural engaging portions 5151 and 5251 in place of the connecting parts 512 and 522.

Structure of Engaging Portions

The engaging portions 5151 and 5251 are bar-shaped members made of the same synthetic resin, and have substantially circular shapes in the cross-sectional view. Similarly to the engaging portions 5121 and 5221, the engaging portions 5151 and 5251 extend in the width directions of the surfaces 511B and 521B to support the surfaces 511B and 521B, and are provided on the surfaces 511B and 521B at equal intervals in the drawing direction A. Each interval of the engaging portions 5151 is determined according to the outside diameter of the engaging portions 5251 in the drawing direction A, and each interval of the engaging portions 5251 is determined according to the outside diameter of the engaging portions 5151 in the drawing direction A. An elastic portion 5152 made of elastic material such as rubber is provided on each outer circumference of the engaging portions 5151 contacting the engaging portions 5251.

When the substrates 51 and 52 are drawn from the winding shafts 31 and 32, the surfaces 511B and 521B come opposed to each other at the combining unit 4. In this condition, either the engaging portions 5151 or 5251 are brought into engagement with the other engaging portions. Under this engagement, the elastic portions 5152 apply inward force to the engaging portions 5251 inserted between the engaging portions 5151. Moreover, since the engaging portions 5151 have large frictional force due to the function of the elastic portions 5152, the engaging portions 5251 do not drop from the positions between the engaging portions 5151. Accordingly, separation of the substrates 51 and 52 from each other is prevented, and thus the combined condition of the substrates 51 and 52 is securely maintained.

The screen 1C having this structure can offer advantages similar to those of the screen 1.

3. Third Embodiment

A third embodiment according to the invention is now described.

A screen in this embodiment has structure similar to that of the screen 1. According to the screen 1, the substrates 51 and 52 are combined by engagement between the engaging portions 5121 and 5221 provided in the width directions of the surfaces 511B and 521B in accordance with the widths thereof. As for the screen in this embodiment, however, engaging portions engaging with each other are provided at both ends of the surfaces 511B and 521B in the width directions. The screen in this embodiment is different from the screen 1 in this point. In the following explanation, the same reference numbers are given to parts same or substantially same as those described above, and the same explanation is not repeated.

Figure 7:
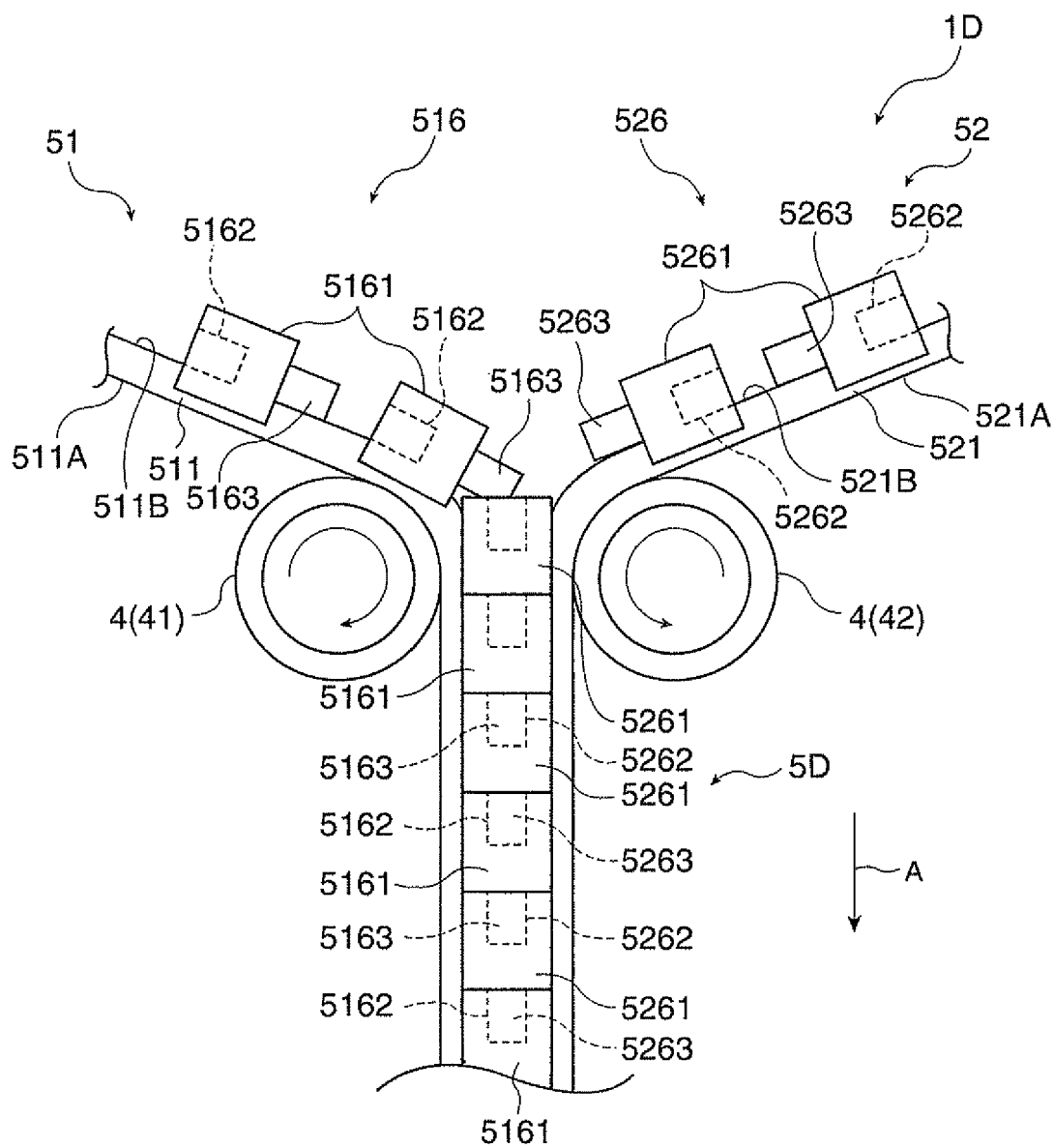
FIG. 7 is a side view of a screen according to a third embodiment of the invention.
Figure 8:
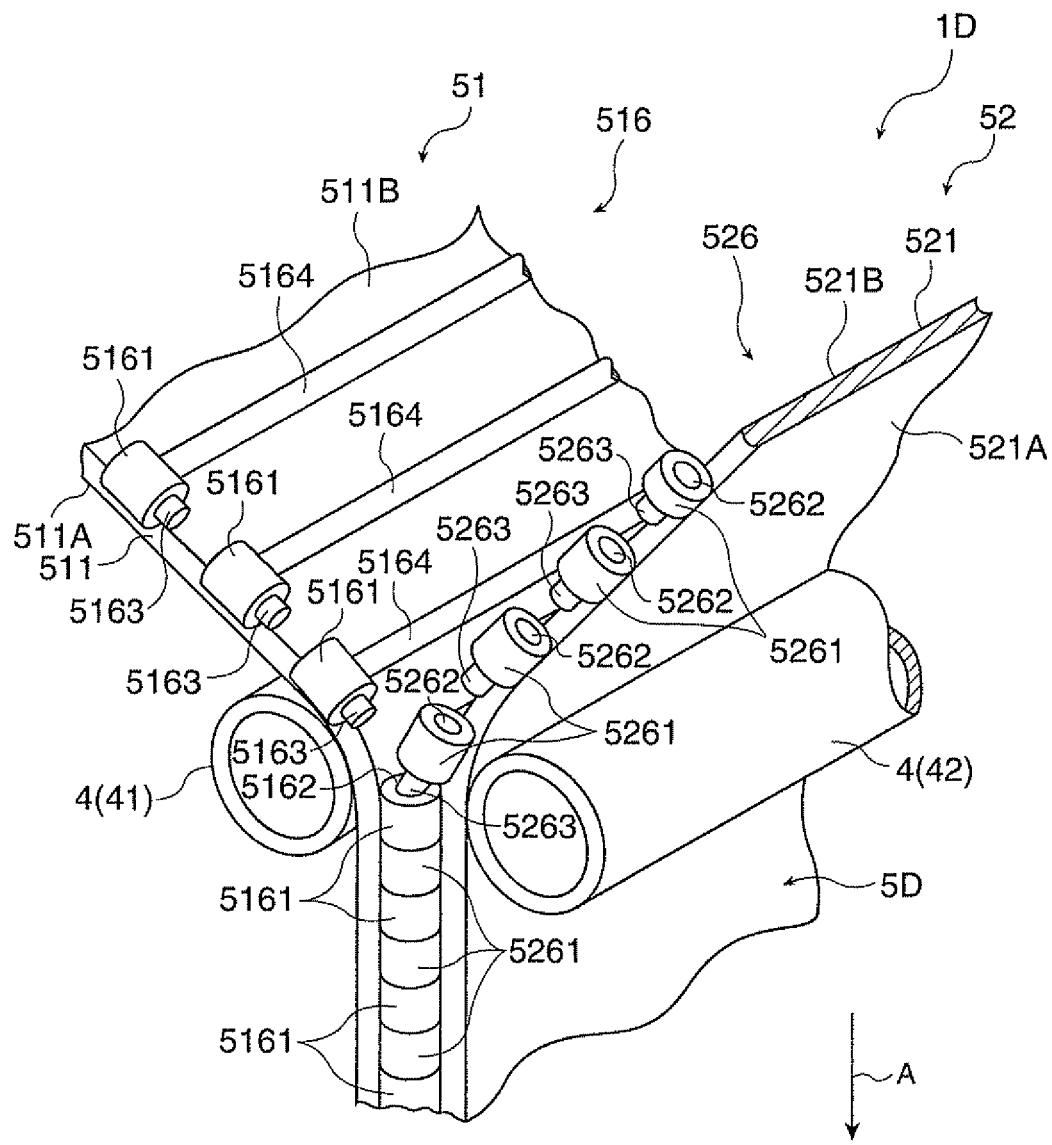
FIG. 8 is a perspective view of the screen according to the third embodiment.

FIGS. 7 and 8 are a side view and a perspective view, respectively, showing a screen 1D in this embodiment.

The screen 1D in this embodiment has functions similar to those of the screen 1, and has structure similar to that of the screen 1 except for a screen base body 5D provided instead of the screen base body 5. As illustrated in FIGS. 7 and 8, the screen base body 5D has structure similar to that of the screen base body 5 except for connecting parts 516 and 526 disposed on the surfaces 511B and 521B in place of the connecting parts 512 and 522.

The connecting part 516 has a plurality of engaging portions 5161 and a plurality of support portions 5164 (FIG. 8).

The engaging portions 5161 are provided at both ends of the surface 511B in the width direction (second direction) at equal intervals in the drawing direction A (first direction). More specifically, the engaging portions 5161 are disposed on the surface 511B at equal intervals in accordance with the outside diameter of engaging portions 5261 described later in the drawing direction A. Each of the engaging portions 5161 has a concave 5162 on the end surface in the direction opposite to the drawing direction A, and a projection 5163 projecting in the drawing direction A on the end surface in the drawing direction A.

As illustrated in FIG. 8, the support portions 5164 are bar-shaped components having substantially circular shapes in the cross-sectional view. Each of the support portions 5164 extends in the width direction of the surface 511B to connect a pair of the engaging portions 5161 positioned at both ends of the surface 511B in the width direction. The support portions 5164 support the surface 511B by the entire surface of the support portions 5164 facing the surface 511B.

As illustrated in FIGS. 7 and 8, the connecting part 526 has a plurality of the engaging portions 5261 and a plurality of support portions (not shown) having substantially the same shapes as those of the engaging portions 5161 and the support portions 5164.

The engaging portions 5261 are provided at both ends of the surface 521B in the width direction at equal intervals in accordance with the outside diameter of the engaging portions 5161 in the drawing direction A. Each of the engaging portions 5261 has a concave 5262 and a projection 5263 similar to the concave 5162 and the projection 5163.

Each of the support portions extends in the width direction of the surface 521B to connect a pair of the engaging portions 5261 at the both ends in the width direction and supports the surface 521B.

The inside diameter of the concaves 5162 is determined in accordance with the outside diameter of the projections 5263, and the inside diameter of the concaves 5262 is determined in accordance with the outside diameter of the projections 5163.

The substrate 51 having the connecting part 516 and the substrate 52 having the connecting part 526 are drawn from the winding shafts 31 and 32 such that the surface 511B and the surface 521B come opposed to each other as explained above. In this condition, the substrates 51 and 52 are combined by engagement between the engaging portions 5161 and 5261 positioned at both ends of the opposed surfaces 511B and 521B in the width directions by the function of the combining unit 4. More specifically, the projections 5163 are inserted into the concaves 5262, and the projections 5263 are inserted into the concaves 5162. The substrates 51 and 52 thus combined are connected in the drawing direction A at both ends in the width directions of the substrates 51 and 52. By this method, cancellation between the stresses acting on the substrates 51 and 52 is achieved, and separation of the substrates 51 and 52 from each other is prevented.

The screen 1D having this structure can offer advantages similar to those of the screen 1.

A linear fastener which has elements provided on the substrates 51 and 52 as engaging portions and a slider provided on the screen base body foldably and for alternately combining the elements may be used as a connecting part in place of the structure of the engaging portions 5161 and 5261. In this case, the housing 2, the winding device 3, and the combining unit 4 can be eliminated, and thus the portability of the screen can be enhanced.

According to the screen 1D, the support portions 5164 for connecting the pairs of the engaging portions 5161 and 5261 provided at both ends in the width directions (the support portions of the connecting part 526 are not shown) are used. However, only the engaging portions 5161 and 5261 may be provided at both ends in the width directions of the surfaces 511B and 521B without using the support portions 5164. In this case, it is preferable that the sheet parts 511 and 521 are made of vinyl chloride resin (hard polyvinyl chloride or soft polyvinyl chloride having relatively large thickness is more preferable). According to this structure, the necessity for providing the support portions is eliminated, and thus the screen becomes more simplified and lightweight. This applies to the connecting part constituted by the linear fastener described above.

Engaging portions having cross-sectional shapes similar to those of the engaging portions in the first and second embodiments may be provided at both ends of the substrates 51 and 52 in the width directions in place of the engaging portions 5161 and 5261.

A connecting portion may be provided on each of the surfaces 511B and 521B as a part attracted to each other by magnetic force in place of the engaging portions 5161 and 5261. In this case, the screen base body whose stresses are cancelled as discussed above can be formed by utilizing the magnetic force attracting the connecting portion on the substrate 51 and the connecting portion on the substrate 52 close to each other when the substrates 51 and 52 are drawn out. Thus, the flatness of the screen base body increases. When a plurality of these connecting portions are provided on each of the surfaces 511B and 521B in the drawing direction A, for example, the stresses causing the curls can be cancelled between the substrates 51 and 52. Moreover, when a plurality of the connecting portions disposed at both ends of the surfaces 511B and 521B in the width directions are provided on each of the surfaces 511B and 521B in the drawing direction A, the stresses causing the warps as well as the stresses causing the curls can be cancelled between the substrates 51 and 52. Thus, the screen having these structures can provide advantages similar to those of the screen 1. In this case, the structures may include the support portions for supporting the surfaces 511B and 521B in the width directions as in the above example.

Furthermore, extending portions projecting from both ends of each of the substrates 51 and 52 in the width directions and extending in the axial direction of the support portions extending in the width directions may be provided and fixed by a separate component to combine the substrates 51 and 52 in place of the engaging portions 5161 and 5261. In this case, the separate component may be a junction unit to which a plurality of annular bodies are joined in the drawing direction A. The annular bodies have holes into which the extending portions are inserted. When the substrates 51 and 52 are drawn out, the support portions on one of the substrates 51 and 52 engage between the support portions on the other substrate. Then, the extending portions on the one substrate and the extending portions on the other substrate are alternately inserted into the holes of the respective annular bodies to connect the support portions and combine the substrates 51 and 52. The screen having this structure can provide advantages similar to those of the screen 1. In this case, only the structure corresponding to the extending portions can be provided on the surfaces 511B and 521B.

4. Fourth Embodiment

A fourth embodiment according to the invention is now described.

The screen in this embodiment has structure similar to that of the screen 1. According to the screen 1, the respective substrates 51 and 52 have the connecting parts 512 and 522 on which the plural engaging portions 5121 and 5221 combined with each other are provided. According to the screen in this embodiment, however, the respective substrates have connecting parts as sheets detachably attached to each other. The screen in this embodiment is different from the screen 1 in this point. In the following explanation, the same reference numbers are given to parts same or substantially same as those described above, and the same explanation is not repeated.

Figure 9:
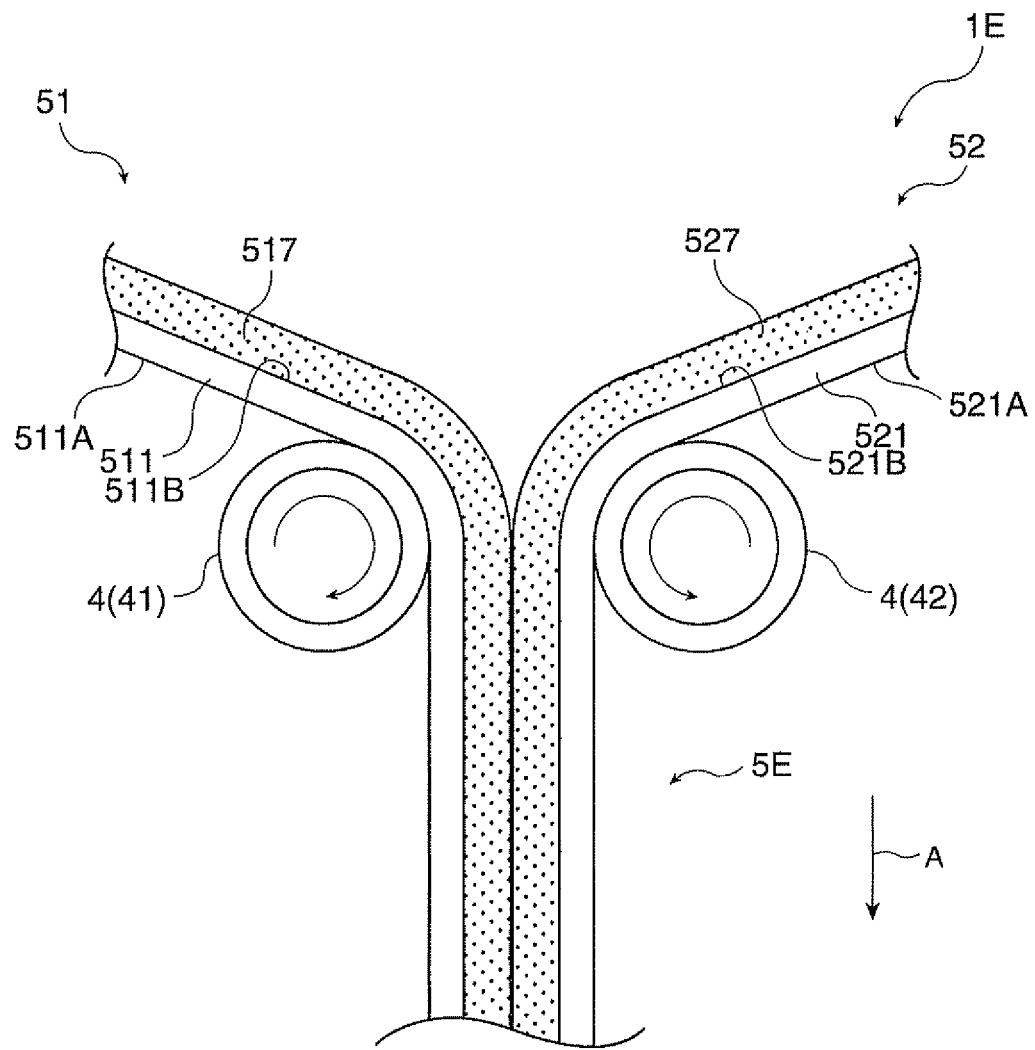
FIG. 9 is a side view of a screen according to a fourth embodiment of the invention.

FIG. 9 is a side view illustrating a screen 1E according to this embodiment.

The screen 1E in this embodiment has structure similar to that of the screen 1 except that a screen base body 5E is provided in place of the screen base body 5. As illustrated in FIG. 9, the screen base body 5E has structure similar to that of the screen base body 5 except that connecting parts 517 and 527 are provided on the surfaces 511B and 521B in place of the connecting parts 512 and 522.

The connecting parts 517 and 527 are disposed at both ends of the surfaces 511B and 521B of the substrates 51 and 52 in the width directions (second direction) and extended in the drawing direction A (first direction). The connecting parts 517 and 527 are sheet-shaped hook-and-loop fasteners attachable to and detachable from each other. When the substrates 51 and 52 are drawn out, the connecting parts 517 and 527 are connected to each other at the combining unit 4. As a result, the substrates 51 and 52 are combined to form the screen base body 5E.

When the substrates 51 and 52 are wound around the winding shafts 31 and 32, the connecting parts 517 and 527 are separated from each other at the combining unit 4.

The screen 1E having this structure can provide advantages similar to those of the screen 1.

According to this structure, the connecting parts 517 and 527 are disposed at both ends of the surfaces 511B and 521B of the substrates 51 and 52 in the width direction and extended in the drawing direction A. However, the connecting parts 517 and 527 may be provided on the entire areas of the surfaces 511B and 521B of the substrates 51 and 52, or provided intermittently thereon.

The connecting parts 517 and 527 are not limited to the sheet-shaped hook-and-loop fasteners but may be sheet-shaped magnets. In this case, the combined substrates 51 and 52 are joined to each other by surface connection in the extending direction of the sheet-shaped magnets. According to this structure, the engaging portions discussed above are not required, and thus the screen becomes extremely simplified and lightweight.

5. Modifications of Embodiments

The invention is not limited to the embodiments described herein, but includes various modifications, improvements and the like without departing from the scope of the invention.

According to the first embodiment, the engaging portions 5121 and 5221 engaging with each other extend in the width directions of the surfaces 511B and 521B, and are connected with each other for the entire areas of the surfaces of the engaging portions 5121 and 5221 facing the surfaces 511B and 521B to support the sheet parts 511 and 521. However, the engaging portions 5121 and 5221 may be intermittently provided in the width directions of the surfaces 511B and 521B, for example. Alternatively, the engaging portions 5121 and 5221 may be provided only at both ends of the surfaces 511B and 521B in the width directions or only at the centers. Thus, the positions of the engaging portions 5121 and 5221 may be arbitrarily determined as long as the substrates 51 and 52 can be appropriately combined.

As described above, the shapes of the engaging portions provided on the surfaces 511B and 521B are not limited to those of the engaging portions 5121, 5221, 5131, 5231, 5141, and 5241 but may be other shapes as long as separation of the substrates 51 and 52 can be prevented.

According to the respective embodiments, the substrates 51 and 52 are wound around the winding shafts 31 and 32 such that the surfaces 511A and 521A are disposed inside. However, the substrates 51 and 52 may be wound such that the surfaces 511B and 521B are disposed inside. In this case, the stresses produced by winding creases and acting on the substrates 51 and 52 can be similarly cancelled by combining the substrates 51 and 52.

According to the second embodiment, the elastic portions 5152 are formed on the outer circumferences of the engaging portions 5151 having substantially circular shapes in the cross-sectional view. However, the elastic portions 5152 may be formed on the outer circumferences of both the engaging portions provided on the substrates 51 and 52. In addition, each of the elastic portions 5152 formed on the entire outer circumference of the engaging portion 5151 in the second embodiment may be provided only on the area contacting the other engaging portion. Furthermore, the elastic portions may be provided on the other engaging portions 5121, 5221, 5131, 5231, 5141, and 5241.

According to the respective embodiments, the combining unit 4 has a pair of the rollers 41 and 42. However, the combining unit 4 may have other structure as long as the respective substrates constituting the screen base body can be positioned close to each other and connected with each other via the connecting parts of the substrates by using the combining unit 4. For example, the combining unit 4 may have a pair of guide members.

According to the respective embodiments, the substrates 51 and 52 are wound around the winding shafts 31 and 32 and accommodated in the housing 2. However, the substrates may be folded and accommodated in the housing 2.

According to the respective embodiments, each of the screen base bodies 5 and 5A through 5E is formed by a pair of the substrates 51 and 52. However, the number of the substrates may be arbitrarily determined as long as the screen base body is formed by plural substrates.

According to the first and second embodiments, the connecting parts 512, 513, 514, 515, 522, 523, 524, and 525 each of which has the plural engaging portions are provided on the surfaces 511B and 521B. According to the third embodiment, the connecting parts 516 and 526 each of which has the plural engaging portions and supporting portions are provided on the surfaces 511B and 521B. However, connecting parts having respective sheet-shaped engaging portions may be attached to the surfaces 511B and 521B, for example.

Accordingly, the technology of the invention is appropriate for a screen, and more particularly for a roll screen.

The entire disclosure of Japanese Patent Application No: 2009-165677, filed Jul. 14, 2009 is expressly incorporated by reference herein.

What is claimed is:

1. A screen comprising:
a screen base body including a first substrate and a second substrate, each of which includes:
a sheet part having an outer surface and an inner surface, the outer surface of the first substrate being substantially uniform and planar so as to be configured to reflect a projected light image, the inner surface of the first substrate facing the inner surface of the second substrate, and
a connecting part provided at the inner surface of the sheet part, the connecting part of the first substrate being detachably connected with the connecting part of the second substrate, each of the connecting parts including a plurality of engaging portions disposed on the inner surface at predetermined intervals in a first direction extending along the inner surface and also disposed on the inner surface in such a manner so as to extend in a second direction perpendicular to the first direction, wherein
each of the engaging portions is an elongated bar;
the screen is configured so that when the screen is used, the screen base body is produced by engaging the engaging portions of the first substrate with the engaging portions of the second substrate such that the substrates can be combined and such that the engaging portions of each of the substrates make contact with the inner surface of the sheet part of the other substrate; and
the engaging portions are configured to engage with each other over the entire dimension of the inner surface in the second direction.

2. The screen according to claim 1, wherein the substrates are combined with each other by the connecting parts such that the substrates are opposed to each other in directions of stresses acting on the substrates.

3. The screen according to claim 1, wherein:
each of the engaging portions has an expanding portion as a larger end on a side away from the inner surface where the engaging portion is provided than the end of the engaging portion on a side close to the inner surface; and
the engaging portions on the first substrate and the engaging portions on the second substrate engage each other by the expanding portions.

4. The screen according to claim 1, wherein each of the engaging portions has an elastic portion in an area contacting the engaging portion provided on another substrate.

5. The screen according to claim 1, wherein each of the connecting parts has a support portion which extends along the one surface and supports the sheet part in the second direction.

6. The screen according to claim 1, wherein the substrates are combined with each other by a surface connection of the connecting parts of the substrates.

7. The screen according to claim 6, wherein the connecting parts include planar hook-and-loop fasteners.

8. The screen according to claim 6, wherein the connecting parts include planar magnets.

9. The screen according to claim 1, further comprising:
a housing which accommodates the substrates;
a combining unit provided within the housing to combine the substrates when the substrates are drawn from the housing; and
a plurality of winding shafts around each of which a corresponding one of the substrates is wound within the housing.

* * * * *